(No Model.)
H. C. SERGEANT.
VALVE FOR AIR COMPRESSORS.
No. 264,775. Patented Sept. 19, 1882.
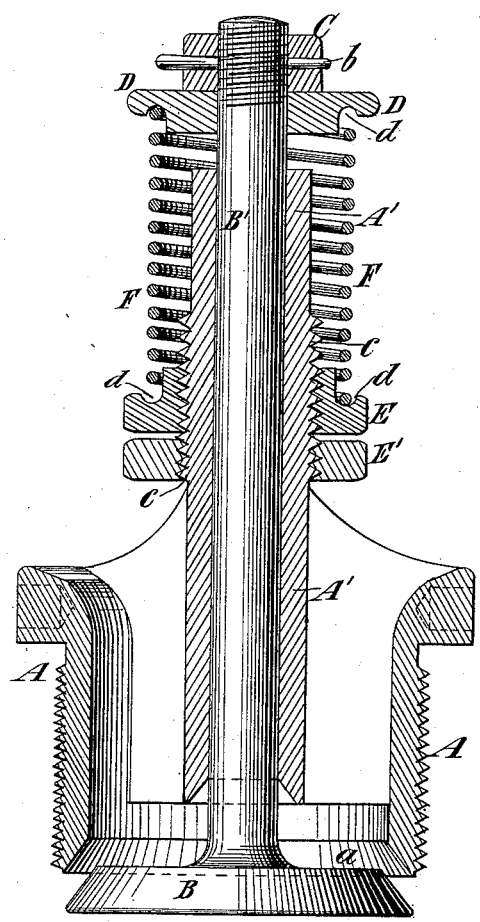
Witnesses.
Inventor.

UNITED STATES PATENT OFFICE.

HENRY C. SERGEANT, OF NEW YORK, N. Y., ASSIGNOR TO THE SERGEANT & CULLINGWORTH COMPANY, OF SAME PLACE.

VALVE FOR AIR-COMPRESSORS.

SPECIFICATION forming part of Letters Patent No. 264,775, dated September 19, 1882.

Application filed May 19, 1882. (No model.)

*To all whom it may concern:*

Be it known that I, HENRY C. SERGEANT, of the city and county of New York, in the State of New York, have invented certain new and useful Improvements in Valves for Air-Compressors, of which the following is a specification.

In one kind of inlet-valves which has been used for air-compressors the stem is provided at the outer end with a nut or nuts. In such valves the closing-spring surrounds the stem and bears at one end against the nut on the stem or a washer placed against the nut, and the tension of the spring may be regulated by adjusting the nut or nuts on the stem. This method of regulating the spring is objectionable, because by adjusting the nut or nuts on the stem the distance of movement allowed the valve in opening is increased or diminished; and the object of my invention is to provide for regulating the tension of the spring without varying the extent of movement allowed to the valve.

To this end my invention consists in the combination, with an inlet-valve for an air-compressor, which is to be held to its seat by spring-pressure, of a valve-stem provided near its outer end with a shoulder, a socket or guide for the stem, provided with an external screw-thread, a nut fitting said screw-thread, and a closing-spring arranged between said shoulder and nut, all adapted to operate substantially as hereinafter described.

The accompanying drawing represents a longitudinal section of a valve embodying my invention, showing the valve as partly open.

A designates the annular casting or casing, in which is formed the valve-seat $a$, and which is represented as externally screw-threaded, so that it may be screwed into the cylinder of an air-compressor. The casting or casing A has formed with it the socket or guide A', and B designates the valve, the stem B' of which fits in said socket or guide. To the outer end of the stem B' is fitted a nut, C, which may be rigidly secured by a pin, $b$, and is not intended to be adjustable; and D designates a washer, which forms in effect a shoulder on the stem. The opening movement of the valve is limited by the washer D striking the end of the socket or guide A'. As the nut C is non-adjustable, the length of movement of the valve B is invariable. The socket or guide has an external screw-thread, $c$, and thereon are fitted two nuts, E E', the latter of which forms a jam-nut.

F designates the spring, which aids in closing the valve, and which bears at one end against the washer D and at the other end against the nut E. The washer D and nut E are represented as provided with annular grooves $d$, in which the end of the spring F rests, and which tend to keep the spring concentric with the stem B'.

It will be readily seen that by adjusting the nuts E E' on the guide the tension of the spring can be regulated as may be desired without in the least varying the length of movement allowed the valve in opening.

What I claim as my invention, and desire to secure by Letters Patent, is—

The combination, with the inlet-valve B for an air-compressor, adapted to be held to its seat by spring-pressure, of the valve-stem B', provided with a shoulder, D, the socket or guide A', provided with the external screw-thread, $c$, the spring F, and nut E, all arranged and adapted to operate substantially as described.

HENRY C. SERGEANT.

Witnesses:
FREDK. HAYNES,
ED. MORAN.